United States Patent [19]

Kikukawa et al.

[11] Patent Number: 4,875,908

[45] Date of Patent: Oct. 24, 1989

[54] PROCESS FOR SELECTIVELY SEPARATING GASEOUS MIXTURES CONTAINING WATER VAPOR

[76] Inventors: Hiroyasu Kikukawa, 348-7 Otami, Okayama-shi; Eiji Shimoda, 17-24 3-chome, Naka-Cho, Musashino-shi; Mari Sakai, 64-8 Akoda, Okayama-shi; Fumiko Kitada, 67-13, Nagaoka, Okayama-shi, all of Japan

[21] Appl. No.: 302,439

[22] Filed: Jan. 26, 1989

[30] Foreign Application Priority Data

Jan. 27, 1988 [JP] Japan .................................. 63-16199

[51] Int. Cl.$^4$ ................................................ B01D 53/22
[52] U.S. Cl. .............................................. 55/16; 55/68
[58] Field of Search ............................ 55/16, 68, 158

[56] References Cited

U.S. PATENT DOCUMENTS

| | | | |
|---|---|---|---|
| 3,735,558 | 5/1973 | Skarstrom et al. | 55/16 |
| 3,735,559 | 5/1973 | Salemme | 55/16 |
| 3,738,813 | 6/1973 | Esmond | 55/158 X |
| 4,497,640 | 2/1985 | Fournié et al. | 55/16 |
| 4,515,761 | 5/1985 | Plotzker | 55/16 X |
| 4,612,019 | 9/1986 | Langhorst | 55/16 |
| 4,732,586 | 3/1988 | Dick et al. | 55/16 X |
| 4,741,744 | 5/1988 | Wu et al. | 55/16 |
| 4,783,201 | 11/1988 | Rice et al. | 55/16 |

FOREIGN PATENT DOCUMENTS

| | | | |
|---|---|---|---|
| 0122049 | 10/1984 | European Pat. Off. | 55/158 |
| 0159783 | 10/1985 | European Pat. Off. | 55/16 |
| 52-000788 | 1/1977 | Japan | 55/16 |
| 60-238119 | 11/1985 | Japan | 55/158 |
| 61-187918 | 8/1986 | Japan | 55/16 |
| 61-229830 | 10/1986 | Japan | 55/16 |
| 62-042723 | 2/1987 | Japan | 55/16 |
| 62-192589 | 8/1987 | Japan | 55/16 |
| 63-209730 | 8/1988 | Japan | 55/16 |
| 63-209731 | 8/1988 | Japan | 55/16 |
| 63-236517 | 10/1988 | Japan | 55/16 |
| 2139110 | 11/1984 | United Kingdom | 55/16 |

Primary Examiner—Robert Spitzer

[57] ABSTRACT

A process for selectively separating water vapor from a multiple component gaseous mixture is provided. The process comprises passing a multicomponent gaseous mixture including water vapor along and in contact with a membrane which is selectively permeable to water vapor and wherein the water vapor permeation rate $Q_{H_2O}$ is greater than 30 Nm$^3$/m$^2$·hr·atm at 25° C. and the ratio of $Q_{H_2O}$ to the permeation rate $Q_G$ of the gas to be separated from the water vapor, i.e., $Q_{H_2O}/Q_G$, is greater than 10,000. The membrane preferably has a thickness of about 0.1 microns to about 50 microns.

20 Claims, No Drawings

PROCESS FOR SELECTIVELY SEPARATING GASEOUS MIXTURES CONTAINING WATER VAPOR

BACKGROUND OF THE INVENTION

The present invention relates to a process for eliminating water vapor from gaseous mixtures by selectively separating water vapor from moisture-laden air, hydrocarbon gases such as natural gas or other industrial process gases.

Methods for removing water vapor from air, separating water from hydrocarbon gases in natural gas or removing water vapor in the manufacturing or purification processes of various types of gases include methods in which water is condensed and removed by compressing the gas that is to be treated and methods in which the moisture content is condensed and removed by cooling. However, such methods require a large driving force or thermal energy for compression or cooling.

The use of moisture-absorbing agents such as $CaCl_2$, NaCl and LiBr is also known. However, the use of such a method requires a moisture-absorbing agent. Because continuous moisture absorption is difficult, it is difficult to apply such a method to an industrial production line which requires continuous operation to be efficient.

A method which removes water vapor by means of a membrane using the difference in the partial pressure of the water vapor has been proposed. The use of such a membrane method makes continuous operation possible. Furthermore, water vapor can be separated using only a relatively small amount of energy. Examples of such processes have been disclosed in Japanese Laid-Open patent application (Kokai) No. 54-114481, in which PVA containing an aqueous solution of lithium chloride is used; Japanese Laid-Open patent application (Kokai) No. 54-152679, in which a cellulose-type membrane is used; Japanese Laid-Open patent application (Kokai) No. 60-261503, in which an organosilane plasma-polymerized membrane is used; Japanese Laid-Open patent application (Kokai) No. 62-42722, wherein a polyamino acid urethane is used; Japanese Laid-Open patent application (Kokai) No. 62-42723, wherein an aromatic polyimide is used; U.S. Pat. No. 3,735,558; Japanese Laid-Open patent application (Kokai) No. 61-187918; Japanese Laid-Open patent application (Kokai) No. 61-229830; Japanese Laid-Open patent application (Kokai) No. 62-7417; and Japanese Laid-Open patent application (Kokai) No. 62-30338, wherein hollow fluororesin-type membranes are used.

In the case of conventional membrane processes, sufficient water vapor selectivity and permeation rate are not obtained. Accordingly, such processes have not yet been widely employed on an industrial level.

Even in the case of processes disclosed very recently, the water vapor permeation rate is relatively low so that a large-scale apparatus is unavoidably necessary in cases where a large-scale industrial treatment is required.

Furthermore, in the case of conventional processes such as those mentioned above, the selective separation properties are not always desirable, either. The separation ratios obtained are generally low, and, in this respect, the processes are disadvantageous in terms of apparatus and operation.

Membranes which are selectively permeable to water vapor and also impermeable to other gases and liquid water are also known, as, for example, in U.S. Pat. No. 4,194,041.

By definition herein, the flow rate of water vapor through a separation membrane is designated $Q_{H_2O}$, the flow rate of other gases that are to be separated from the water vapor is designated $Q_G$ and the ratio of water vapor flow rate to the flow rate of the gas that is to be separated from the water vapor, i.e., $Q_{H_2O}/Q_G$, is designated as X.

Even in theoretical terms, it has been difficult to obtain a membrane material with a high $Q_{H_2O}$ and a high X ratio in the range of industrially feasible membrane thicknesses.

SUMMARY OF THE INVENTION

A process for selectively separating water vapor from a multiple component gaseous mixture is provided. The process comprises passing a multicomponent gaseous mixture including water vapor along and in contact with a membrane which is selectively permeable to water vapor wherein the water vapor permeation rate, $Q_{H_2O}$, is greater than 30 $Nm^3/m^2 \cdot hr \cdot atm$ at 25° C. and the ratio of $Q_{H_2O}$ to the permeation rate $Q_G$ of the gas to be separated from the water vapor, i.e., $Q_{H_2O}/Q_G$, is greater than 10,000. The water vapor permeation rate $Q_{H_2O}$ can exceed 80 $Nm^3/m^2 \cdot hr \cdot atm$. The selectively permeable membrane comprises a fluororesin copolymer which contains a hydrophilic functional group such as a sulfonic acid group, a sulfuric acid group, a carboxylic acid group or an ammonium salt group. The membrane preferably is a composite membrane comprising a fluororesin copolymer film which contains a hydrophilic functional group laminated to a support layer. The support layer may be a sheet of cellulose, a sheet of porous polyolefin, including porous polytetrafluoroethylene, a sheet of polyester or a sheet of polysulfonate. The support layer is a fabric, woven, nonwoven or knitted. The membrane has a thickness of about 0.1 to about 50 microns.

DETAILED DESCRIPTION OF THE INVENTION AND PREFERRED EMBODIMENTS

A process for selectively separating water vapor from a multiple component gaseous mixture is provided. The process comprising passing a multicomponent gaseous mixture including water vapor along in contact with a membrane which is selectively permeable to water vapor and wherein the water vapor permeation rate $Q_{H_2O}$ is greater than 30 $Nm^3/m^2 \cdot hr \cdot atm$ at 25° C. and the ratio of $Q_{H_2O}$ to the permeation rate $Q_G$ of the gas to be separated from the water vapor, i.e., $Q_{H_2O}/Q_G$, is greater than 10,000. $Nm^3$ designates normal cubic meters, which is the gaseous volume in cubic meters at the condition that the temperature is zero degrees Celsius and the pressure is one atmosphere.

By using a fluororesin-type copolymer membrane which has hydrophilic functional groups such as sulfonic acid groups or sulfonate groups or a composite membrane which consists of such a fluororesin-type copolymer membrane and a material which supports the membrane, it is possible to obtain a high $Q_{H_2O}$ and a high X ratio in a product which is within the industrially feasible membrane thickness range of 0.1 to 50 microns.

Specifically, the hydrophilic functional groups contained in the fluororesin with which the aforementioned porous support is laminated or impregnated as described above cause water vapor to be adsorbed onto the surface of the membrane, and to diffuse osmotically through the membrane layer to the other side of the membrane.

By setting the water vapor permeation rate $Q_{H2O}$ at 30 Nm³/m²·hr·atm or greater, and setting the ratio X of $Q_{H2O}$ to the permeation rate $O_G$ of the gas that is to be separated from the water vapor, i.e., $Q_{H2O}/Q_G$, at 10,000 or greater, it is possible to perform a highly efficient separation treatment with selectivity for water vapor.

By supporting the aforementioned fluororesin copolymer membrane with a porous membrane, or with a woven fabric, knitted fabric or nonwoven fabric, it is possible to insure acceptable strength so that the membrane will be able to withstand working, handling and pressure conditions during the gas separation treatment.

Regarding the hydrophilic functional groups contained in the fluororesin with which the aforementioned porous support is laminated or impregnated, sulfonic acid groups and sulfonate groups are especially desirable. Besides such groups, however, sulfuric acid groups, carboxylic acid groups, carboxylate groups or ammonium salt groups may be used. As a result of the impregnation or lamination of the aforementioned support to a fluororesin membrane containing such hydrophilic functional groups, the composite membrane material becomes a nonporous body, at least in the thickness direction. As a result, the membrane is virtually impermeable to air, nitrogen and hydrocarbon gases such as methane gas. Water vapor, however, is adsorbed to the membrane surface by the hydrophilic functional groups in the fluororesin with which the support is laminated or impregnated. This water vapor subsequently diffuses through the membrane layer, and rapidly passes through the membrane. The driving force of this action is the partial pressure difference of the vapor across the membrane. If this partial pressure difference is large, the water vapor permeation rate is large.

The membrane of the present invention can be manufactured as a membrane with a thickness of approximately 0.1 to 50 microns, which is suited to industrial mass production. In the case of the present invention, a product in this membrane thickness range possesses a $Q_{H2O}$ of 30 Nm³/m²·hr·atm or greater, an and X ratio ($Q_{H2O}/Q_G$) of 10,000 or greater.

The formed membrane is dried under appropriate drying conditions, e.g., the membrane is subjected to a drying treatment in a thermostat for 30 to 300 minutes at 60°–150° C., and preferably 100 to 200 minutes at 90°–120° C., to form a desirable product.

As a result of being supported by an appropriate support, the aforementioned membrane is also acceptable in terms of strength, and the water vapor separating operation is stable.

Examples of porous supports which can be used include cellulose-type, polyolefin-type, polyester-type, polysulfonate-type and fluororesin-type porous resin-type support which possesses heat resistance and chemical resistance is most desirable, such as the porous expanded polytetrafluoroethylene (EPTFE) disclosed in U.S. Pat. Nos. 3,953,566 and 4,187,390.

The following examples are illustrative of the method of making and using a membrane composite according to the invention but are not intended to limit the scope of the claims hereinbelow in any way.

EXAMPLE 1

A fluororesin copolymer membrane containing sulfonic acid groups, being a copolymer of tetrafluoroethylene and perfluorovinylether was formed to a thickness of 10 microns on the surface of a porous EPTFE membrane having a thickness of 40 microns, a porosity of 75% and a maximum pore diameter of 0.5 microns as determined by ethanol bubble point test method ASTM F316-80. Following air drying, the membrane was treated in a thermostat for 180 minutes at 100° C., producing a product of the present invention as a membrane which is selectively permeable to water vapor.

Table 1 shows the gas permeation rates and separation ratios obtained for water vapor, $N_2$, $O_2$, $H_2$ and $CH_4$ using this permeable membrane. Permeation testing for water vapor was carried out by feeding water vapor containing air to the feed side of the membrane and the opposite, permeating side is depressurized to 1 Torr. The water vapor permeated through the membrane into the permeating side is condensed to liquid by a cold trap and the quantity (Q) is measured. The partial pressure (P1) of water in the air at the feed side is determined by measuring the dew point and that (P2) at the permeating side is taken as the depressurized pressure. The permeating velocity (K) is calculated from the following equation:

$$Q = K(P1 - P2)AH$$

wherein A=membrane area and H=measuring period.

For $N_2$, $O_2$, $H_2$ and $CH_4$, each pure gas is supplied at the feed side of the membrane and the opposite, permeating side is depressurized as before. The content of each pure gas both at the feed side and at the permeating side is measured by means of gas chromatography. From these data, the quantity (Q) of each pure gas permeated through the membrane is determined as above. The partial pressures of each pure gas at the feed side (P1) and at the permeating side (P2) are in this case each the pressures at the feed side and that of the depressurized permeating side. The permeating velocity (K) of each pure gas is calculated from the above-mentioned equation.

TABLE 1

| | Gas Permeation Rate Nm³/m² · hr · atm | Permeation Rate Ratio X ($Q_{H2O}/Q_G$) |
|---|---|---|
| Water Vapor | 37 | — |
| $N_2$ | $3.3 \times 10^{-4}$ | 252000 |
| $O_2$ | $3.5 \times 10^{-4}$ | 143000 |
| $H_2$ | $3.0 \times 10^{-3}$ | 28000 |
| $CH_4$ | $3.1 \times 10^{-4}$ | 268000 |

EXAMPLE 2

The same porous, expanded polytetrafluoroethylene membrane used in Example 1 was impregnated with a 9% ethanol solution of the fluororesin copolymer containing sulfonic acid groups used in Example 1. The impregnated membrane was allowed to stand for 24 hours at 40° C., and was then further dried for 180 minutes at 120° C. to produce a membrane selectively permeable to water vapor.

Table 2 shows the gas permeation rates and separation ratios obtained for water vapor, $N_2$, $O_2$, $H_2$ and $CH_4$ using this permeable membrane, all measured as in Example 1.

TABLE 2

| | Gas Permeation Rate $Nm^3/m^2 \cdot hr \cdot atm$ | Permeation Rate Ratio $X (Q_{H_2O}/Q_G)$ |
|---|---|---|
| Water Vapor | 37 | — |
| $N_2$ | $8.5 \times 10^{-5}$ | 435000 |
| $O_2$ | $1.5 \times 10^{-4}$ | 247000 |
| $H_2$ | $7.7 \times 10^{-4}$ | 48000 |
| $CH_4$ | $8.0 \times 10^{-5}$ | 463000 |

EXAMPLE 3

A fluororesin copolymer membrane containing carboxylate groups, being a copolymer of tetrafluoroethylene and perfluorovinylether was formed to a thickness of 5 microns on the surface of a porous polypropylene membrane of thickness 25 microns, pore diameter of 0.02 microns to 0.2 microns and porosity of 38%. Following air drying, the membrane was treated in a thermostat for 180 minutes at 100° C., producing a membrane selectively permeable to water vapor.

Table 3 shows the gas permeation rates and separation ratios obtained for water vapor, $N_2$, $O_2$, $H_2$ and $CH_4$ using this permeable membrane, measured as above.

TABLE 3

| | Gas Permeation Rate $Nm^3/m^2 \cdot hr \cdot atm$ | Permeation Rate Ratio $X (Q_{H_2O}/Q_G)$ |
|---|---|---|
| Water Vapor | 33 | — |
| $N_2$ | $3.9 \times 10^{-4}$ | 85000 |
| $O_2$ | $6.8 \times 10^{-4}$ | 49000 |
| $H_2$ | $3.1 \times 10^{-3}$ | 11000 |
| $CH_4$ | $3.7 \times 10^{-4}$ | 89000 |

As described above, the present invention makes it possible to manufacture, in an industrially efficient manner, a membrane selectively permeable to water vapor which has a high water vapor permeation rate, which is superior in terms of selective separation properties and which makes it possible to perform an efficient treatment using a relatively compact apparatus.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A process for selectively separating water vapor from a multiple component gaseous mixture, said process comprising passing a multicomponent gaseous mixture including water vapor along and in contact with a membrane which is selectively permeable to water vapor and wherein the water vapor permeation rate $Q_{H_2O}$ is greater than 30 $Nm^3/m^2 \cdot hr \cdot atm$ at 25° C. and the ratio of $Q_{H_2O}$ to the permeation rate $Q_G$ of the gas to be separated from said water vapor, i.e., $Q_{H_2O}/Q_G$, is greater than 10,000.

2. The process of claim 1 where the water vapor permeation rate $Q_{H_2O}$ exceeds 80 $Nm^3/m^2 \cdot hr \cdot atm$.

3. The process of claim 1 wherein said membrane comprises a fluororesin copolymer which contains a hydrophilic functional group.

4. The process of claim 3 wherein said functional group is a sulfonic acid group.

5. The process of claim 3 wherein said functional group is a sulfonate group.

6. The process of claim 3 wherein said functional group is a sulfuric acid group.

7. The process of claim 3 wherein said functional group is a carboxylic acid group.

8. The process of claim 3 wherein said functional group is a carboxylate group.

9. The process of claim 3 wherein said functional group is an ammonium salt group.

10. The process of claim 1 wherein said membrane is a composite membrane comprising a fluororesin copolymer film which contains a hydrophilic functional group laminated to a support layer.

11. The process of claim 10 wherein said support layer is a sheet of porous, expanded polytetrafluoroethylene.

12. The process of claim 10 wherein said support layer is a sheet of cellulose.

13. The process of claim 10 wherein said support layer is a sheet of porous polyolefin.

14. The process of claim 10 wherein said support layer is a sheet of polyester.

15. The process of claim 10 wherein said support layer is a sheet of polysulfonate.

16. The process of claim 10 wherein said support layer is a fabric.

17. The process of claim 16 wherein said fabric is woven.

18. The process of claim 16 wherein said fabric is nonwoven.

19. The process of claim 16 wherein said fabric is knitted.

20. The process of claim 1 wherein said membrane has a thickness of about 0.1 to about 50 microns.

* * * * *